United States Patent
Susarla et al.

(10) Patent No.: US 10,320,907 B2
(45) Date of Patent: Jun. 11, 2019

(54) MULTI-STAGE PREFETCHING TO EXPLOIT LONG-TERM FUTURE DATA ACCESS SEQUENCE KNOWLEDGE

(71) Applicant: NetApp, Inc., Sunnyvale, CA (US)

(72) Inventors: Sai Rama Krishna Susarla, Bangalore (IN); Pooja Garg, Madhya Pradesh (IN)

(73) Assignee: NETAPP, INC., Sunnyvale, CA (US)

(*) Notice: Subject to any disclaimer, the term of this patent is extended or adjusted under 35 U.S.C. 154(b) by 256 days.

(21) Appl. No.: 15/276,008

(22) Filed: Sep. 26, 2016

(65) Prior Publication Data

US 2018/0091593 A1 Mar. 29, 2018

(51) Int. Cl.
G06F 15/167 (2006.01)
H04L 29/08 (2006.01)

(52) U.S. Cl.
CPC ...... H04L 67/1097 (2013.01); H04L 67/2847 (2013.01)

(58) Field of Classification Search
None
See application file for complete search history.

(56) References Cited

U.S. PATENT DOCUMENTS

| | | | | |
|---|---|---|---|---|
| 5,892,765 A * | 4/1999 | Shapard | ................. | H04L 29/06 370/401 |
| 6,553,389 B1 * | 4/2003 | Golding | .............. | G06F 11/1425 |
| 6,556,659 B1 * | 4/2003 | Bowman-Amuah | ... | H04L 12/14 370/252 |
| 6,775,703 B1 * | 8/2004 | Burns | ................. | G06F 12/0866 709/223 |
| 7,636,801 B1 * | 12/2009 | Kekre | ................. | H04L 67/1097 709/218 |
| 8,832,234 B1 * | 9/2014 | Brooker | ............... | G06F 16/182 709/219 |
| 9,727,273 B1 * | 8/2017 | Dantkale | ............... | G06F 3/0641 |
| 2005/0210218 A1 * | 9/2005 | Hoogterp | .............. | G06F 3/0613 711/203 |
| 2013/0046949 A1 * | 2/2013 | Colgrove | .............. | G06F 3/0608 711/170 |
| 2013/0339319 A1 * | 12/2013 | Woodward | ........ | G06F 17/30581 707/692 |
| 2014/0089265 A1 * | 3/2014 | Talagala | ............ | G06F 17/30551 707/674 |

(Continued)

Primary Examiner — Phyllis A Book
(74) Attorney, Agent, or Firm — Haynes and Boone, LLP (57) ABSTRACT

A system and method for scheduling the pre-loading of long-term data predicted to be requested in future time epochs into a faster storage tier are disclosed. For each epoch into the future, which may be on the order of minutes or hours, data chunks which may be accessed are predicted. Intersections are taken between predicted data chunks, starting with the furthest predicted epoch in the future, ranging back to the next future epoch. These are then intersected with adjacent results, on up a hierarchy until an intersection is taken of all of the predicted epochs. Commands are generated to preload the data chunks predicted to have the most recurring accesses, and the predicted data chunks are pre-loaded into the cache. This proceeds down the load order until either the last predicted data set is pre-loaded or it is determined that the cache has run out of space.

19 Claims, 4 Drawing Sheets

(56) References Cited

U.S. PATENT DOCUMENTS

| | | | | |
|---|---|---|---|---|
| 2014/0344216 A1* | 11/2014 | Abercrombie | .... | G06F 17/30575 707/609 |
| 2015/0006788 A1* | 1/2015 | Liu | ...................... | G06F 3/0685 711/103 |
| 2016/0203053 A1* | 7/2016 | Talagala | .............. | H04L 67/1097 714/6.12 |

* cited by examiner

MULTI-STAGE PREFETCHING TO EXPLOIT LONG-TERM FUTURE DATA ACCESS SEQUENCE KNOWLEDGE

TECHNICAL FIELD

The present description relates to data storage systems, and more specifically, to systems, methods, and computer-program products for scheduling the pre-loading of data predicted to be requested in future time epochs (e.g., on the order of minutes or hours into the future) into a faster storage tier.

BACKGROUND

In storage systems, caching generally refers to storing data in a faster storage tier for quicker response times when a host next requests the same data. Predictive caching refers to the ability of a storage system to populate a faster storage tier with data in anticipation of access so as to maximize access performance while minimizing data movement overhead across storage tiers. Current approaches rely upon spatial locality at fine granularity (with respect to the size of the datasets generally) although the large datasets do not exhibit sufficient access locality.

Typical approaches to predictive caching focus on a short look-ahead time frame, such as on the order of just a few seconds. Using these approaches for longer-term predictions, however, becomes unwieldy due to the increase in overhead for the tracking as well as a potential mismatch in size between the predicted dataset and the size of the cache (e.g., prediction of 100 GB of data versus a cache size of 1 GB). Further, loading data prematurely into a faster storage tier can jeopardize cache hits that could have otherwise been possible with data already in the cache.

Loading data from a slower storage tier may consume a non-trivial amount of time, for example where the upcoming shift in working dataset is large. Delaying the preloading too much, i.e. by relying on short-term caching solutions, may cause the desired data to arrive too late to the cache to contribute to application hits, thereby further harming system performance.

BRIEF DESCRIPTION OF THE DRAWINGS

The present disclosure is best understood from the following detailed description when read with the accompanying figures.

DETAILED DESCRIPTION

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for scheduling the pre-loading of data predicted to be requested in future time epochs (e.g., on the order of minutes or hours into the future) into a faster storage tier (e.g., a cache).

This is accomplished via cache warming, otherwise referred to as the loading of speculative data (i.e., data predicted to be in demand in the future) for a working set (i.e., the set of data being accessed/manipulated over time by an application) into a faster storage tier in a storage system. This is accomplished according to the pre-loading approaches described herein based on how far in the future the data is anticipated to be accessed (beginning and ending) and the data's expected contribution to cache hits for the given application across epochs (discrete periods of time).

The cache warming occurs for multiple epochs in the future. For example, the system may pre-load predicted working set data for several epochs into the future. Each epoch may be a longer period of time, ranging from a minute, several minutes, up to hours (thus, longer than short-term approaches, i.e. on the order of minutes or hours versus short-term's seconds). The size of the epoch may be calibrated so that it is small enough to not be too large to load within the time the predicted data will be needed, but still large enough so as to look meaningfully into the future, such as minutes or hours. For example, the size may be hundreds of megabytes so that low-overhead tracking is enabled.

The working sets for the epochs in the future may be predicted according to several different approaches. Some example approaches include tracking raw data of history (e.g., several hours' worth) or tracking with data reduction techniques such as tracking frequency of access of defined data blocks in bins (i.e., logical block address space being divided into the bins, also referred to as data chunks), clustering of those data chunks over time (based on histograms of the data chunks per each epoch and grouping of these histograms), and predicting based on best matching sequences (i.e., based on centroids of clustered histograms). Whatever the approach to prediction, once the predictions have been obtained for several future epochs, embodiments of the present disclosure intelligently organize the prefetching of the data to optimize cache hits and minimize adverse system performance impacts.

Intersections may be taken between predicted data chunks, starting with the furthest predicted epoch in the future, ranging back to the next future epoch to the current epoch. These intersections identify data chunks of different predicted data sets that overlap. Then, the intersections of adjacent intersections are taken, on up a hierarchy of rows until an intersection is taken of all of the predicted epochs, which corresponds to data chunks predicted to have recurring accesses furthest into the future.

Commands are generated to preload the data chunks predicted to have the most recurring accesses furthest into the future, and the data chunks are pre-loaded into the cache. The approach then proceeds down the load order to the next most frequent predicted accesses the next furthest into the future. This load order continues until either the last predicted data set is pre-loaded or it is determined that the cache has run out of space (e.g., by comparison to a threshold size).

As a result, a storage system is able to more efficiently process I/O requests. For example, embodiments of the present disclosure may improve cache hit rates significantly with lookaheads many minutes into the future, i.e. 30 minutes, such as where the target storage tier is a predictive solid state drive (SSD) cache, all while keeping overhead low. This may improve application performance, and hence storage system performance, by improving cache hits and reducing wasted data movement.

Figure 1:
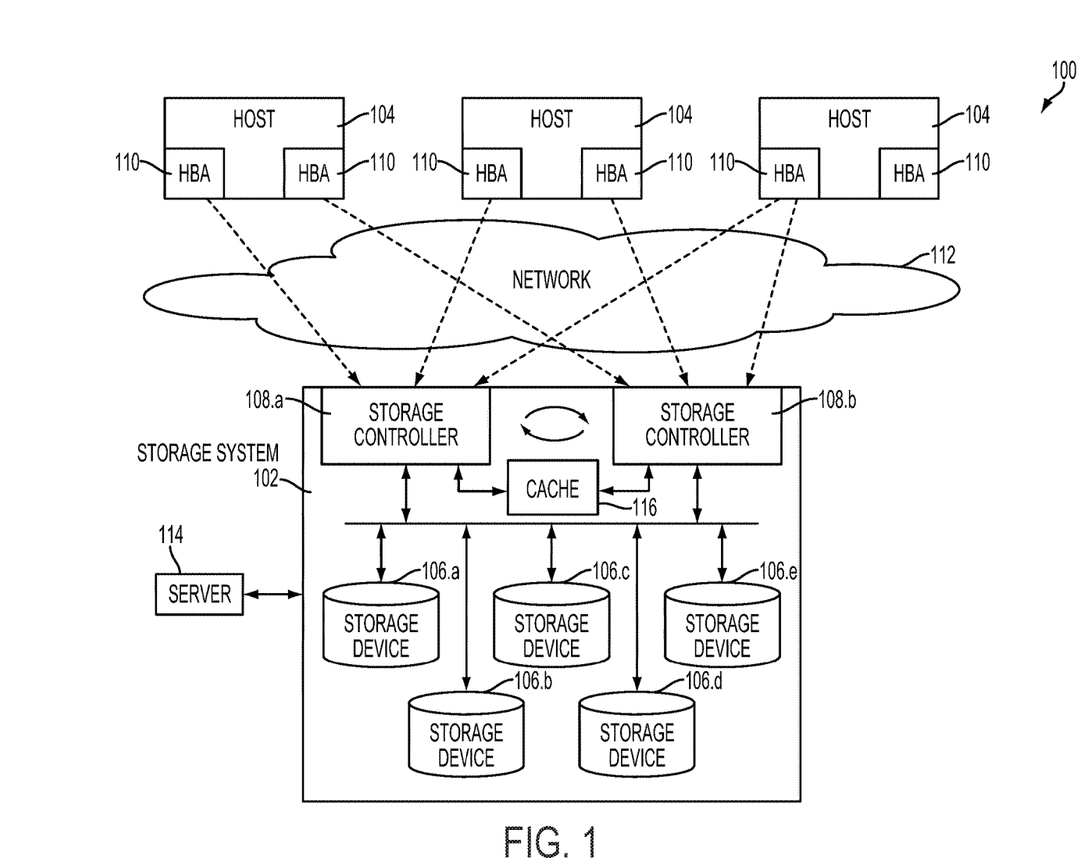
FIG. 1 is an organizational diagram of an exemplary data storage architecture according to aspects of the present disclosure.

FIG. 1 illustrates a data storage architecture 100 in which various embodiments may be implemented. Specifically, and as explained in more detail below, one or both of the storage controllers 108.a and 108.b read and execute computer readable code to perform the methods described further herein to perform long-term prediction of future data accesses (e.g., on the order of minutes to hours) and to schedule loading of data to a faster storage tier to maximize performance while minimizing data movement overhead across data storage tiers.

The storage architecture 100 includes a storage system 102 in communication with a number of hosts 104. The storage system 102 is a system that processes data transactions on behalf of other computing systems including one or more hosts, exemplified by the hosts 104. The storage system 102 may receive data transactions (e.g., requests to write and/or read data) from one or more of the hosts 104, and take an action such as reading, writing, or otherwise accessing the requested data. For many exemplary transactions, the storage system 102 returns a response such as requested data and/or a status indictor to the requesting host 104. It is understood that for clarity and ease of explanation, only a single storage system 102 is illustrated, although any number of hosts 104 may be in communication with any number of storage systems 102.

While the storage system 102 and each of the hosts 104 are referred to as singular entities, a storage system 102 or host 104 may include any number of computing devices and may range from a single computing system to a system cluster of any size. Accordingly, each storage system 102 and host 104 includes at least one computing system, which in turn includes a processor such as a microcontroller or a central processing unit (CPU) operable to perform various computing instructions. The instructions may, when executed by the processor, cause the processor to perform various operations described herein with the storage controllers 108.a, 108.b in the storage system 102 in connection with embodiments of the present disclosure. Instructions may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The processor may be, for example, a microprocessor, a microprocessor core, a microcontroller, an application-specific integrated circuit (ASIC), etc. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a network interface such as an Ethernet interface, a wireless interface (e.g., IEEE 802.11 or other suitable standard), or any other suitable wired or wireless communication interface; and/or a user I/O interface coupled to one or more user I/O devices such as a keyboard, mouse, pointing device, or touchscreen.

With respect to the storage system 102, the exemplary storage system 102 contains any number of storage devices 106 and responds to one or more hosts 104's data transactions so that the storage devices 106 may appear to be directly connected (local) to the hosts 104. In various examples, the storage devices 106 include hard disk drives (HDDs), solid state drives (SSDs), optical drives, and/or any other suitable volatile or non-volatile data storage medium. In some embodiments, the storage devices 106 are relatively homogeneous (e.g., having the same manufacturer, model, and/or configuration). However, the storage system 102 may alternatively include a heterogeneous set of storage devices 106 that includes storage devices of different media types from different manufacturers with notably different performance.

The storage system 102 may group the storage devices 106 for speed and/or redundancy using a virtualization technique such as RAID or disk pooling (that may utilize a RAID level). The storage system 102 also includes one or more storage controllers 108.a, 108.b in communication with the storage devices 106 and any respective caches (e.g., cache 116). The storage controllers 108.a, 108.b exercise low-level control over the storage devices 106 in order to execute (perform) data transactions on behalf of one or more of the hosts 104. The storage controllers 108.a, 108.b are illustrative only; more or fewer may be used in various embodiments. Having at least two storage controllers 108.a, 108.b may be useful, for example, for failover purposes in the event of equipment failure of either one. The storage system 102 may also be communicatively coupled to a user display for displaying diagnostic information, application output, and/or other suitable data.

In an embodiment, the storage system 102 may group the storage devices 106 using a dynamic disk pool (DDP) (or other declustered parity) virtualization technique. In a DDP, volume data, protection information, and spare capacity are distributed across all of the storage devices included in the pool. As a result, all of the storage devices in the DDP remain active, and spare capacity on any given storage device is available to all volumes existing in the DDP. Each storage device in the DDP is logically divided up into one or more data extents (which may also be referred to as data blocks herein) at various block addresses of the storage device. A data extent (or block) is assigned to a particular data stripe of a volume.

An assigned data extent becomes a "data piece," and each data stripe has a plurality of data pieces, for example sufficient for a desired amount of storage capacity for the volume and a desired amount of redundancy, e.g. RAID 0, RAID 1, RAID 10, RAID 5 or RAID 6 (to name some examples). As a result, each data stripe appears as a mini RAID volume, and each logical volume in the disk pool is typically composed of multiple data stripes. Further, according to embodiments of the present disclosure, one or more data stripes may compose a given segment as used herein (i.e., a segment may include some integer number of data stripes).

In addition, the storage system 102 may also include a cache 116. The cache 116 may be composed of one or more storage devices, such as one or more solid-state devices, other flash memory, or battery-backed DRAM that exhibit faster characteristics than one or more of the storage devices 106. The cache 116 may be used to store data to be written to or read from the storage devices 106. Although illustrated as separate from the storage controllers 108.*a*, 108.*b*, the cache 116 may be included in either or both storage controllers. Where each storage controller 108 includes a cache 116, the cache 116 may be mirrored to guard against data loss. Thus, as an example storage controller 108.*a* may store a copy of data and/or metadata in its cache 116 from one or more future time epochs to "warm" the cache, according to embodiments of the present disclosure, prior to performing the predicted transaction from one or more hosts 104. Duplication may occur to the storage controller 108.*b*'s cache 116.

In some embodiments, the cache 116 is dedicated to a particular caching type, e.g. short-term or long-term, while in other embodiments a given cache 116 is partitioned between different caching needs. For example, a first portion may be reserved for short-term caching, referring herein to caching on the order of at most seconds into the future (including potentially recently-requested data in the event it is requested again). Short-term caching may utilize temporal locality (recently used data) and/or spatial locality (predicting data use based on nearby data block access). Short-term caching typically looks to recent transactions in the past few seconds and predictions a few seconds into the future.

A second portion may be reserved for long-term caching, or cache warming, which describes the speculative prediction and loading of data on the order of minutes to hours into the future. As used herein, "epochs" or "time epochs" refers to a discrete period of time for which cache warming occurs. For example, an epoch may be set to have a size on the order of minutes. Thus, over each epoch, data transactions are monitored and entered into prediction algorithms. These produce predictions of what data may be required in future time epochs, or in other words minutes or hours into the future. The predicted data may be referred to as working sets—each epoch may have a working set of predicted data. Each working set may be further broken down into chunks of data, referred to herein as either data chunks or data bins, that are collections of logical block addresses (LBAs), i.e. a data chunk has a range of LBAs that are contiguous to each other. These chunks of data may be sized into large enough units so as to enable low-overhead tracking and pre-loading.

The size of the epoch may be calibrated so that it is small enough to not be too large to load within the time the predicted data will be needed, but still large enough so as to look meaningfully into the future, such as minutes or hours. For example, the size may be hundreds of megabytes so that low-overhead tracking is enabled. Further, although illustrated as a single cache 116, the cache 116 may represent multiple tiers, i.e. different levels of cache with differing characteristics, such as a first storage tier being faster than the storage devices 106 but slower than a second storage tier "above" the first storage tier (as just one example).

Embodiments of the present disclosure describe how to schedule the predicted data to load into the cache 116 according to the data's possible relevance across a number of epochs, the size of the cache 116, and any other possible considerations as will be further described herein. The larger the size of the cache 116, the more predicted data from future epochs may be loaded to the cache 116 during the current epoch to pre-warm the cache 116.

In the present example, storage controllers 108.*a* and 108.*b* are arranged as an HA pair. Thus, when storage controller 108.*a* performs a write operation for a host 104, storage controller 108.*a* may also sends a mirroring I/O operation to storage controller 108.*b*. Similarly, when storage controller 108.*b* performs a write operation, it may also send a mirroring I/O request to storage controller 108.*a*.

Each of the storage controllers 108.*a* and 108.*b* has at least one processor executing logic to schedule pre-loading of data predicted to be requested in future time epochs into a faster storage tier according to embodiments of the present disclosure.

With respect to the hosts 104, a host 104 includes any computing resource that is operable to exchange data with storage system 102 by providing (initiating) data transactions to the storage system 102. In an exemplary embodiment, a host 104 includes a host bus adapter (HBA) 110 in communication with a storage controller 108.*a*, 108.*b* of the storage system 102. The HBA 110 provides an interface for communicating with the storage controller 108.*a*, 108.*b*, and in that regard, may conform to any suitable hardware and/or software protocol. In various embodiments, the HBAs 110 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire.

The HBAs 110 of the hosts 104 may be coupled to the storage system 102 by a network 112, for example a direct connection (e.g., a single wire or other point-to-point connection), a networked connection, or any combination thereof. Examples of suitable network architectures 112 include a Local Area Network (LAN), an Ethernet subnet, a PCI or PCIe subnet, a switched PCIe subnet, a Wide Area Network (WAN), a Metropolitan Area Network (MAN), the Internet, Fibre Channel, or the like. In many embodiments, a host 104 may have multiple communicative links with a single storage system 102 for redundancy. The multiple links may be provided by a single HBA 110 or multiple HBAs 110 within the hosts 104. In some embodiments, the multiple links operate in parallel to increase bandwidth.

To interact with (e.g., write, read, modify, etc.) remote data, a host HBA 110 sends one or more data transactions to the storage system 102. Data transactions are requests to write, read, or otherwise access data stored within a data storage device such as the storage system 102, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The storage system 102 executes the data transactions on behalf of the hosts 104 by writing, reading, or otherwise accessing data on the relevant storage devices 106. A storage system 102 may also execute data transactions based on applications running on the storage system 102 using the storage devices 106. For some data transactions, the storage system 102 formulates a response that may include requested data, status indicators, error messages, and/or other suitable data and provides the response to the provider of the transaction.

Moreover, the storage system 102 may be communicatively coupled to a server 114. The server 114 includes at least one computing system, which in turn includes a processor, for example as discussed above. The computing system may also include a memory device such as one or more of those discussed above, a video controller, a network interface, and/or a user I/O interface coupled to one or more user I/O devices. The server 114 may include a general purpose computer or a special purpose computer and may be embodied, for instance, as a commodity server running a storage operating system. While the server 114 is referred to as a singular entity, the server 114 may include any number of computing devices and may range from a single computing system to a system cluster of any size.

In an embodiment, the server 114 may also provide data transactions to the storage system 102, and in that sense may be referred to as a host 104 as well. The server 114 may have a management role and be used to configure various aspects of the storage system 102 as desired, for example under the direction and input of a user. Some configuration aspects may include definition of RAID group(s), disk pool(s), and volume(s), to name just a few examples. These configuration actions described with respect to server 114 may, alternatively, be carried out by any one or more of the other devices identified as hosts 104 in FIG. 1. According to embodiments of the present disclosure, the server 114 may include monitoring, prediction, and tuning functionality to the storage controllers 108 managing the cache 116, while in other embodiments the monitoring, prediction, and tuning functionality may be implemented by one or both of the storage controllers 108, as will be described with respect to the other figures further below.

Data transactions are often categorized as either block-level or file-level. Block-level protocols designate data locations using an address within the aggregate of storage devices 106. Suitable addresses include physical addresses, which specify an exact location on a storage device, and virtual addresses, which remap the physical addresses so that a program can access an address space without concern for how it is distributed among underlying storage devices 106 of the aggregate. Exemplary block-level protocols include iSCSI, Fibre Channel, and Fibre Channel over Ethernet (FCoE). iSCSI is particularly well suited for embodiments where data transactions are received over a network that includes the Internet, a WAN, and/or a LAN. Fibre Channel and FCoE are well suited for embodiments where hosts 104 are coupled to the storage system 102 via a direct connection or via Fibre Channel switches. A Storage Attached Network (SAN) device is a type of storage system 102 that responds to block-level transactions.

In contrast to block-level protocols, file-level protocols specify data locations by a file name. A file name is an identifier within a file system that can be used to uniquely identify corresponding memory addresses. File-level protocols rely on the storage system 102 to translate the file name into respective memory addresses. Exemplary file-level protocols include SMB/CIFS, SAMBA, and NFS. A Network Attached Storage (NAS) device is a type of storage system that responds to file-level transactions. As another example, embodiments of the present disclosure may utilize object-based storage, where objects are instantiated that are used to manage data instead of as blocks or in file hierarchies. In such systems, objects are written to the storage system similar to a file system in that when an object is written, the object is an accessible entity. Such systems expose an interface that enables other systems to read and write named objects, that may vary in size, and handle low-level block allocation internally (e.g., by the storage controllers 108.*a*, 108.*b*). It is understood that the scope of present disclosure is not limited to either block-level or file-level protocols or object-based protocols, and in many embodiments, the storage system 102 is responsive to a number of different data transaction protocols.

The working sets for the epochs in the future may be predicted according to several different approaches. Some example approaches include tracking raw data of history (e.g., several hours' worth) or tracking with data reduction techniques such as tracking frequency of access of defined data blocks in bins (i.e., logical block address space being divided into the bins), clustering of those bins over time (based on histograms of the bins per each epoch and grouping of these histograms), and predicting based on best matching sequences (i.e., based on centroids of clustered histograms).

Figure 2:
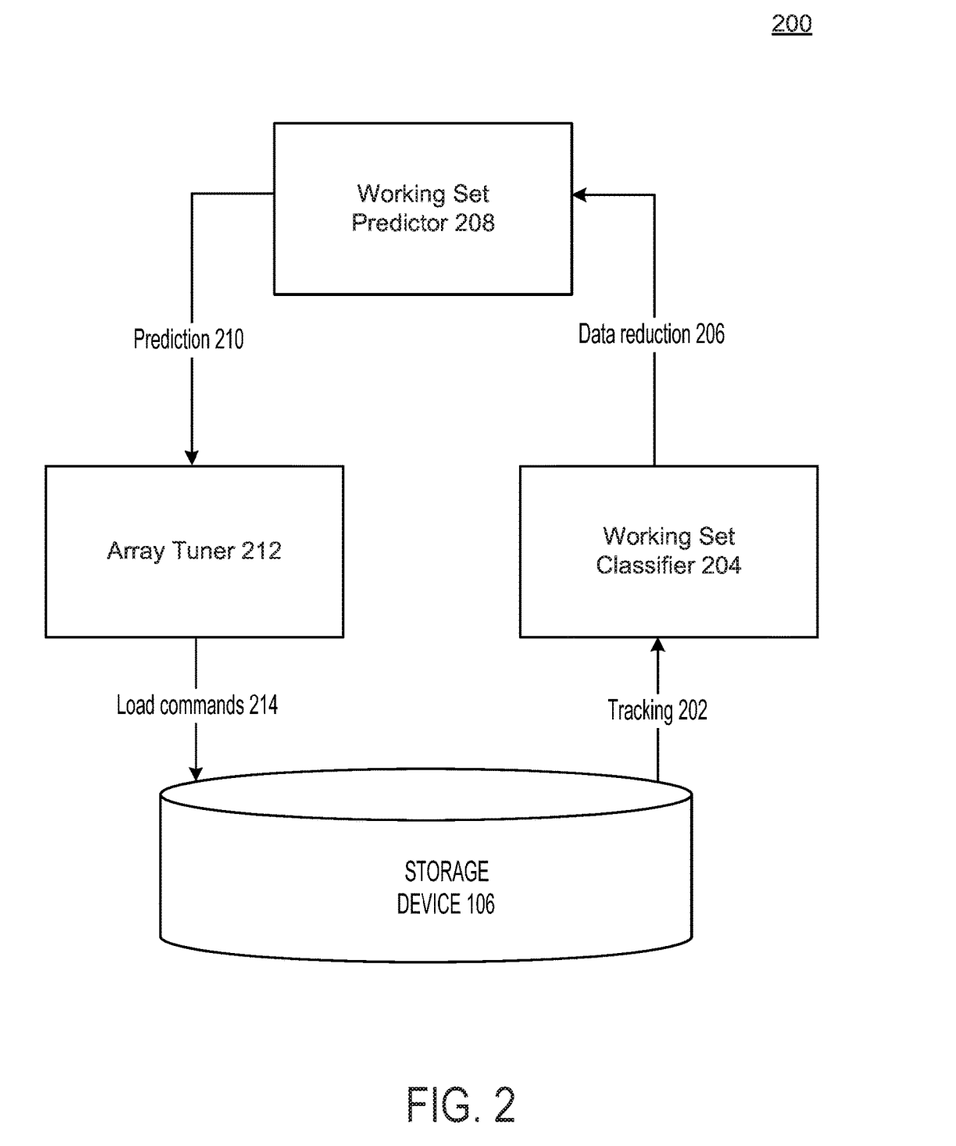
FIG. 2 is an organizational diagram of an exemplary cache warming architecture according to aspects of the present disclosure.

FIG. 2 is an organizational diagram of an exemplary cache warming architecture 200 according to aspects of the present disclosure. In an embodiment, the working set classifier 204, the working set predictor 208, and the array tuner 212 (or any one or combination of these) may be implemented by a storage controller 108. Alternatively, any one or more of these aspects may be implemented externally by the server 114 such as a monitoring/controlling server or one or more of the hosts 104 that provide I/O requests along the data path, or some combination of the above. Either way, the array tuner 212 may be outside the data path for I/O.

For simplicity of discussion, the working set classifier 204, the working set predictor 208, and the array tuner 212 will be described herein with reference to the storage controller 108 (any one of those in the HA pair, or both together). Data may be tracked by data chunks as noted above, in order to reduce the tracking burden on the system (as well as the storage burden of that tracking, particularly with large data sets and I/O burdens).

As data I/O occurs, the cache warming architecture 200 engages in tracking 202 the data I/O. This tracked data from tracking 202 is fed to the working set classifier 204. The working set classifier 204 tracks the data access history in intervals (e.g., of one minute each by way of example only, other interval sizes are possible) and clusters them so as to reduce the dataset size as noted above. Some example approaches include tracking 202 raw data of history (e.g., several hours' worth) or tracking 202 with data reduction techniques such as tracking 202 frequency of access of defined data blocks in bins (i.e., logical block address space being divided into the bins) and clustering of those bins over time (based on histograms of the bins per each epoch and grouping of these histograms).

The working set classifier 204 may engage in some form of dataset reduction as noted above, and the results of tracking 202 and data reduction 206 fed to a working set predictor 208. The data reduction 206 includes a long history, in reduced form, that identifies clusters (as an example) and a recent, short history (shorter than the long history, such as the last five clusters) which implements one or more algorithms to predict what defined data blocks may be "hot" (frequently accessed/modified/etc.) in future epochs. The working set predictor 208 outputs a prediction 210 that identifies the next data chunk or chunks (LBA ranges) that are predicted to be the target of the next request in the associated epoch.

For example, the working set predictor 208 may output predictions 210 for the next n epochs that identify the data chunk or chunks that each of the n epochs is predicted to request (i.e., either data or data reduced versions of that data, such as a histogram that identifies the data chunks/bins, or LBA ranges, that may be requested as well as their predicted frequency over the given epoch). For purposes of description herein as will be seen with respect to the example in FIG. 3, these predictions 210 are labeled P1 for the predicted data in the next epoch from the current epoch, P2 for the epoch after P1, P3 for the epoch after P2, and P4 for the epoch after P5.

In some embodiments, the working set predictor 208 may output all of the predictions 210 (predicted working sets for the determined number of epochs in the future) at the start of a new epoch. In other embodiments, the working set predictor 208 may output the next epoch for the latest epoch in the future (i.e., where the system is set for the next four epochs, a new P4 is output at the start of a new epoch, where the prior P4 becomes P3, P3 becomes P2, and so on). Outputting all of the predictions 210 of working sets in future epochs at the start of each current epoch may capitalize on more accurate estimates as the epochs draw closer in time to the current epoch. Further, the predictions 210 may either identify the data chunks (e.g., by starting LBA where the chunks have uniform size) where the predicted working sets are located or include the working set data itself.

The number of epochs into the future that are predicted for cache warming may vary. The number of epochs may be large enough to provide for a sufficient reaction time to changing workload I/O demand, but still small enough to provide meaningful predictions into the future (as predictions further in the future may have lower accuracy). Thus, although the examples herein typically describe with respect to four future epochs, ten may be used, or more or fewer. Further, the number of epochs to be predicted into the future may be changed dynamically, for example by a user entering a new value or some other system trigger (e.g., the system itself monitoring over time and observing that the number of future epochs predicted is repeatedly too large to fully load into the cache 116 or alternatively small enough that it can all regularly be loaded to the cache 116).

However the future time epochs are predicted and output as predictions 210, the array tuner 212 receives the predictions 210. The array tuner 212 operates according to embodiments of the present disclosure to intelligently pre-load the different predicted working sets of the n future epochs into the desired storage tier. In particular, the array tuner 212 may determine an order in which to schedule pre-loading of the data from the predicted working sets and issue load commands 214 to load the data according to the schedule the array tuner 212 determined. For example, the array tuner 212 may use an algorithm that receives as input the predictions 210 (e.g., histograms representing the predicted number of read/write accesses to chunks of LBAs in a given epoch, where histograms are used for data reduction, otherwise generally the predicted working sets or representations thereof) and outputs load commands 214 until it determines that the cache 116 cannot store any more data for the cache warming aspects. Thus, the load command 214 to pre-load data chunks into the target storage tier of the cache 116 may be configured according to an application programming interface (API) exported by the storage system 102's target storage tier of cache 116 for caching.

Continuing with the present example (i.e., where n=4), the array tuner 212 therefore receives the predicted data sets P1, P2, P3, and P4, where P1 is associated with the next epoch in time in the future and P4 is associated with the furthest in the future of the sets P1-P4. With this information, the array tuner 212 generates load commands 214 for those data blocks from the sets P1-P4 that are not already present in the desired storage tier of the cache 116.

Figure 3:
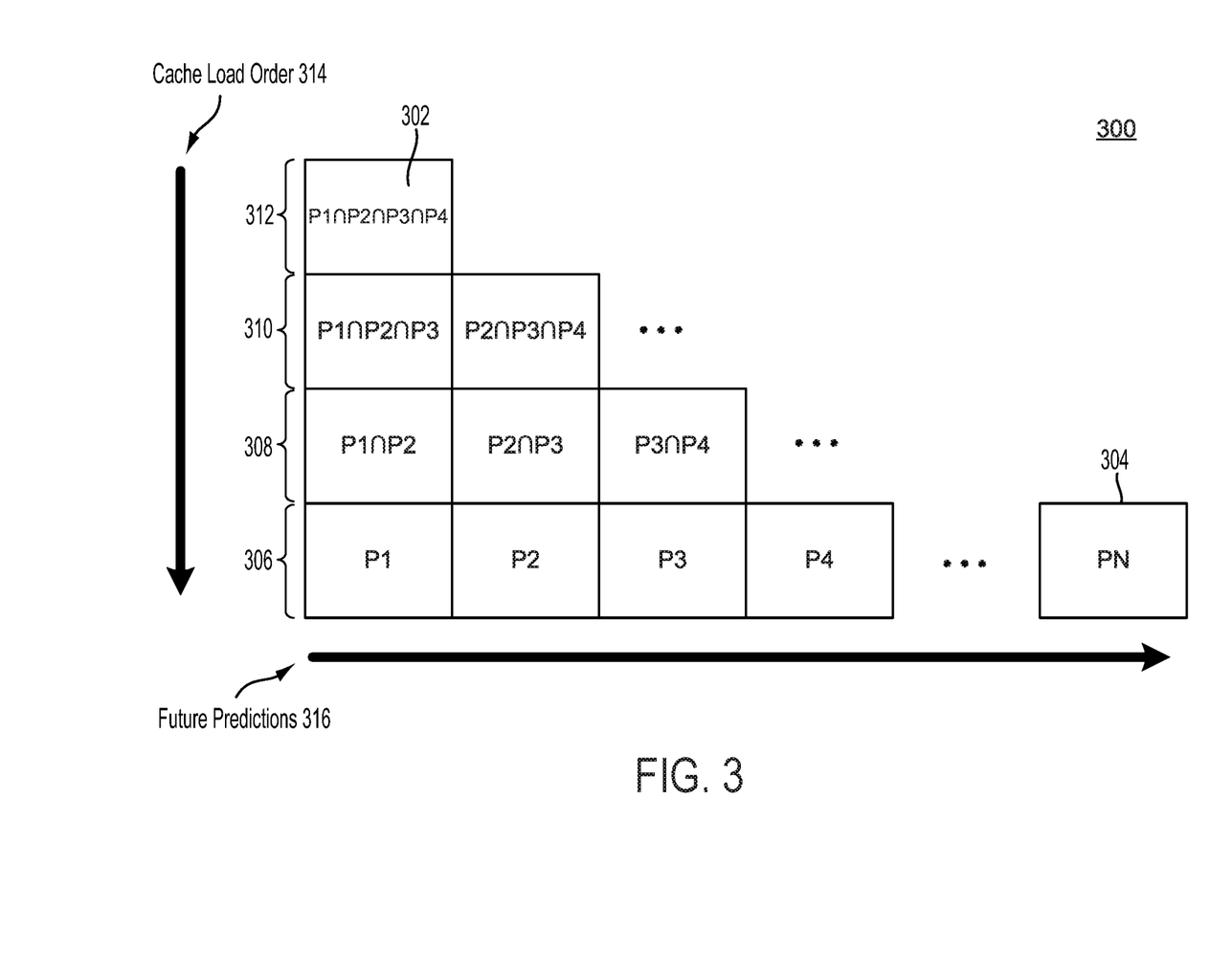
FIG. 3 is an organizational diagram of an exemplary long-term prediction and cache warming logical structure according to aspects of the present disclosure.

An example to illustrate the algorithm for the array tuner 212 is illustrated in FIG. 3, which is an organizational diagram of an exemplary long-term prediction and cache warming logical structure 300 according to aspects of the present disclosure. The algorithm may maintain a progressive working set intersection matrix (illustrated as the logical structure 300 in FIG. 3) that provides the common working set for the next m epochs, where m ranges from 1 to n.

FIG. 3 illustrates multiple working sets 302 according to a cache load order 314 and future predictions 316 hierarchy. The nth working set 304 illustrates that n working sets may be predicted for corresponding n epochs into the future. As illustrated, the x-axis represents time, the future predictions 316. Thus, the working set 302 identified as P1 in FIG. 3, corresponding to the first future time epoch (the next epoch). P2 is after P1, P3 is after P2, and P4 is after P3, thus constituting the first row 306 along the x-axis of future predictions 316.

At the second row 308 along the x-axis of future predictions 316 above the first row 306, intersections between the adjacent working set predictions for their respective epochs are made. Thus, for example, the working set for the predicted data P1 is intersected with predicted data P2, predicted data P2 with predicted data P3, and predicted data P3 with predicted data P4. The intersections are with respect to the data chunks in the working sets—thus, for example, if data falling within an LBA of a given data chunk are predicted to be accessed during the epoch corresponding to predicted data P1, as well as in the epoch corresponding to predicted data P2, then an identification of that data chunk is the result of the intersection of predicted data P1 and predicted data P2.

At the third row 310 along the x-axis of future predictions 316 above the second row 308, having the results of the intersections for the predicted data P of the adjacent epochs, intersections of those results (identified in the second row 308) are then made with the predicted data for the next epoch after the last epoch of the original intersection—e.g., the intersection of predicted data P1 and predicted data P2 then with predicted data P3, and the intersection of predicted data P2 and predicted data P3 then with predicted data P4. Thus, the results of these intersections for the third row 310 may be smaller in size (e.g., fewer data chunks identified) than the results of the intersections of predicted data P on the second row 308 as the probability of intersection potentially decreases with more working set predictions.

Finally, at the fourth row 312 along the x-axis of future predictions 316 above the third row 310, an intersection is taken with the predicted data P all of the epochs—predicted data P1 with predicted data P2, with predicted data P3, and with predicted data P4 (where n=4 in this example). This identifies those data chunks, if any, that are predicted to have data accessed across all of the n epochs included in the predictions 210. Thus, the result of the intersection for the fourth row 312 may be smaller in size (e.g., fewer data chunks identified as common in all of the predicted data P) than the results from the third row 310, as the probability of intersection potentially decreases.

The structure of the long-term prediction and cache warming logical structure 300 (also referred to as a working set intersection matrix) of FIG. 3 is arranged in a hierarchal manner identified by the cache loading order 314. Instructions to load (e.g., generation of the load commands 214 from FIG. 2) begin with the fourth row 312 into the target storage tier. This represents the most likely set of data chunks with recurring access requests that lasts furthest into the future. The cache load order 314 then continues with the results of the third row 310. This represents the next most likely set of data chunks into the future. The cache load order 314 then continues with the second row 308, followed finally by the first row 306.

If the result of any given intersection is null, i.e. there are not common data chunks between the compared predicted data working sets, then the algorithm according to FIG. 3 may stop there for the current epoch (i.e., the current epoch in which the algorithm is running). Thus, the remaining intersections at higher rows may not be taken. For example, if the intersection of the predicted data P3 and the predicted data P4 results is null (no intersections), then additionally intersecting with the predicted data P2 is not necessary during the current epoch (though that might not be the case in future epochs). The cache load order 314 may then begin where the intersection computing stopped.

The hierarchal manner of loading typically results in generating load commands to load the smallest predicted working set(s) first, since these are the predicted working sets across all of the epochs included in consideration (in the example of FIG. 3, four epochs). Loading commands continue until the cache 116 is determined to run out of space (whether allocated or actual). Thus, if the target storage tier of the cache 116 is large enough, and assuming that there are common data chunks identified from each intersection, as illustrated in FIG. 3 the order of pre-loading commands (and hence pre-loading itself to the cache 116) would be:

P1∩P2∩P3∩P4 (starting at the fourth row 312);

P1∩P2∩P3 and P2∩P3∩P4 (next the third row 310, those data chunks that were not identified from the fourth row 312);

P1∩P2, P2∩P3, and P3∩P4 (next the second row 308, those data chunks that were not identified from the fourth row 312 and third row 310); and P1, P2, P3, and P4 (finally the first row 306, those data chunks that were not already identified from the fourth row 312, third row 310, and second row 308).

This is just one example for purposes of illustration, which can be generalized to any number n of future time epochs according to embodiments of the present disclosure.

If the target storage tier of the cache 116 is not sufficiently large to hold all of the predicted data chunks for the predicted data working sets P for n epochs into the future, then loading may occur until a threshold size is reached. That threshold size may be selected as a matter of system policy relating to how much reserve space is desired for the cache 116 for short-term caching (i.e., on the order of seconds) versus long-term caching (over minutes/hours according to embodiments of the present disclosure). The threshold size may be changed by the system or a user of the system dynamically during operation to take effect at the start of the next epoch from the current epoch as noted.

For example, the storage controller 108 implementing the algorithm according to the long-term prediction and cache warming logical structure 300 may track the total size of the cache 116 dedicated to long-term caching. The storage controller 108 may further track the total amount of space currently occupied by long-term predicted data and, prior to every load command 214, calculate the combination of the current amount of space occupied with the added size of the predicted data for the next possible load command 214, and compare that result with the threshold size. Alternatively, the commands may all be determined at approximately the same time, such that a total size of the predicted data can be analyzed in combination with what is at that time already in the cache 116 to determine how much of the predicted data the array tuner 212 may command to be loaded into the cache 116 during the current epoch.

Once the threshold amount of occupied space in the target storage tier of the cache 116 is reached (e.g., according to calculations of size), the array tuner 212 stops generating load commands 214 to pre-load data from the predicted data chunks of the lower rows of the long-term prediction and cache warming logical structure 300. This may repeat at the start of each epoch, so that more data chunks may be pre-loaded in each new epoch for those data chunks that are not predicted to be accessed as frequently across the n epochs as those at the upper rows of the long-term prediction and cache warming logical structure 300. A cache management system may be used underneath, for example, to remove the least used data in each epoch and otherwise perform cache content management.

As noted above, embodiments of the present disclosure may be applicable to any number of storage tiers of one or more caches 116 in a storage system 102. For example, where the storage system 102 only has a single caching layer (cache 116) above the storage array (storage devices 106), the algorithm illustrated by the long-term prediction and cache warming logical structure 300 may be used to efficiently pre-load predicted data working sets as described herein into the single caching layer. As another example, where the storage system 102 has multiple storage tiers, such as a first storage tier with faster access times than the storage array (storage devices 106) and a second storage tier that has yet faster access times than the first storage tier (e.g., multiple caches 116), the present disclosure may be applied to the first storage tier, the second storage tier, or both (e.g., in cooperation with a "short term" caching algorithm of data actually accessed in the past).

Figure 4:
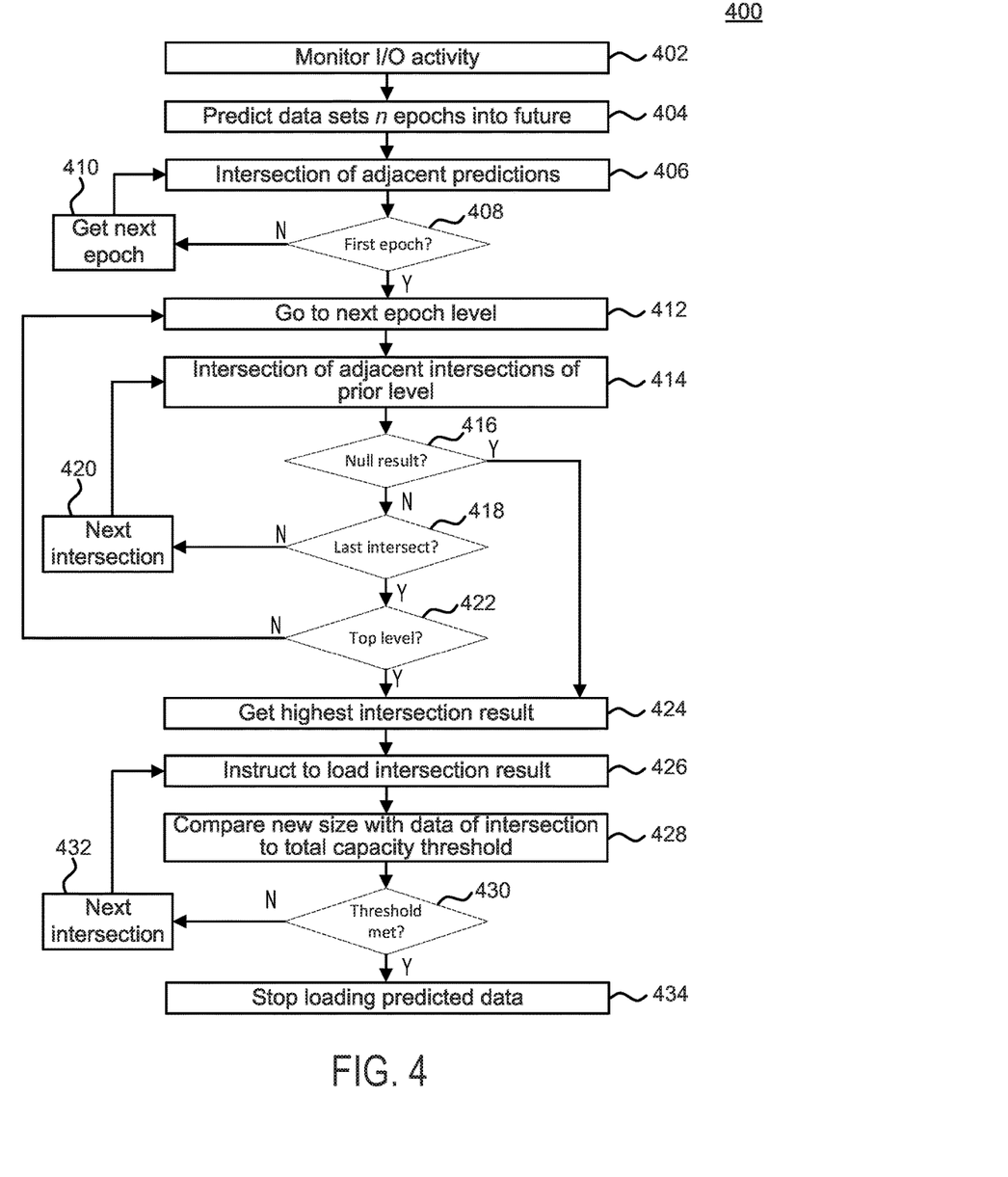
FIG. 4 is a flow diagram of a method for long-term prediction and cache warming according to aspects of the present disclosure.

Turning now to FIG. 4, a flow diagram is illustrated of a method 400 for long-term prediction and cache warming according to aspects of the present disclosure. In some embodiments, the method 400 may be implemented by one or more processors of one or more of the storage controllers 108 of the storage system 102, executing computer-readable instructions to perform the functions described herein. In other embodiments, the method 400 may be implemented by a server 114 external to the storage system 102.

In the description of FIG. 4, reference is made to a storage controller 108 (108.a or 108.b) for simplicity of illustration, and it is understood that other storage controller(s) or servers may be configured to perform the same functions when performing operations according to the present disclosure. It is understood that additional steps can be provided before, during, and after the steps of method 400, and that some of the steps described can be replaced or eliminated for other embodiments of the method 400.

At block 402, the storage controller 108 (e.g., via the working set classifier 204) monitors I/O activity to the storage devices 106 over time. Thus, as the storage controller 108 monitors I/O activity during a current epoch, this may be added to a history of I/O activity from prior epochs (as well as earlier during the same epoch).

At block 404, the storage controller 108 predicts (e.g., via the working set predictor 208) the working data sets that will be accessed up to n epochs into the future. This prediction may be performed on a per-epoch basis, such that each predicted working data set has a future epoch that it is associated with. This may be done at the start of a new epoch, for example.

At block 406, the storage controller determines (e.g., via the array tuner 212) the intersections between adjacent future epochs, such as described according to the long-term prediction and cache warming logical structure 300 illustrated in FIG. 3.

At decision block 408, if the first future epoch has not been reached, then the method 400 proceeds to block 410. As noted with respect to FIG. 3, the determinations of the intersections may begin with the furthest epoch n in the future for which data is predicted (furthest to the right on the axis of future predictions 316) and move to the left closer to the present time and the "first future epoch" that is the next epoch to the current epoch.

At block 410, the predicted data working set for the next future epoch is obtained, which in this context means the m−1 epoch, where m ranges from 1 to n in reverse chronological order. The method 400 proceeds then back to block 406 as detailed above and discussed further below.

Returning to decision block 408, if the first future epoch has been reached, then the method 400 proceeds to block 412. At block 412, the method 400 transitions to the next epoch level, corresponding to the rows discussed with respect to FIG. 3. Thus, the method 400 transitions from determining the intersections of predicted data of the epochs of first row 306 to the intersections of second row 308.

At block 414, the storage controller 108 determines (e.g., via the array tuner 212) the intersection between adjacent intersections of future epochs, such as described with respect to FIG. 3 for any of rows 308, 310, and 312 (depending upon which row the method 400 is currently at). Thus, for example, if currently at second row 308 of FIG. 3, the storage controller 108 determines intersections of the P2∩P3 result and P4. As another example, if currently at row 310 of FIG. 3, the storage controller 108 determines the intersection of all of the predicted data sets of the n future epochs.

At decision block 416, if the result of an intersection determination for two adjacent intersection results in some non-null value, then the method 400 proceeds to decision block 418. As noted above, a null value indicates that there were no intersecting data chunks between data sets under comparison.

At decision block 418, it is determined whether the last intersection for the current row (e.g., second row 308 or third row 310) has been reached. If not, then the method 400 proceeds to block 420.

At block 420, the method 400 transitions to the next intersection result (i.e., in reverse chronological order similar to above with respect to block 410, albeit at a different row in the long-term prediction and cache warming logical structure 300). For example, if the intersection was just determined for the P2∩P3 result and P4, then block 410 gets the intersection result P1∩P2 and determines the intersection between that and P3. From block 420, the method returns to block 414 as discussed above and further below.

Returning to decision block 418, if it is determined that the last intersection for a current row has been reached (i.e., an intersection of the predicted data sets for the closest future epochs), then the method 400 proceeds to decision block 422.

At decision block 422, if the top row (e.g. fourth row 312 of the example in FIG. 3) has not been reached, namely the method 400 is currently not at the top row, then the method 400 proceeds back to block 412 as discussed above to move to the next row up and proceed as detailed. If the top row has been reached, then the method 400 proceeds to block 424.

At block 424, the storage controller 108 (e.g., via the array tuner 212) obtains the highest intersection result, or in other words the intersection result from the highest row reached in the long-term prediction and cache warming logical structure 300 (whether the top row or a null value before then). This intersection result constitutes one or more data chunks that are predicted to have recurring access requests that last furthest into the future.

Returning to decision block 416, if the result of an intersection determination is a null value, then the method 400 proceeds to block 424.

From block 424, the method 400 proceeds to block 426, where the storage controller 108 generates a load command (e.g., load command 214 via the array tuner 212) that will instruct the system to load the one or more data chunks into the target storage tier of the cache 116.

At block 428, the storage controller 108 compares (e.g., via the array tuner 212) the size that the cache 116 will be with the addition of the one or more data chunks to any existing cached data, to a threshold size for the cache 116 for long-term caching according to embodiments of the present disclosure.

At decision block 430, if the threshold size is not met yet, then the method 400 proceeds to block 432 where additional intersection results from lower rows are obtained. The method 400 then returns to block 426 and proceeds as discussed above and below. For example, after generating a load command 214 for the top row, corresponding to one or more data chunks that are predicted to have recurring access furthest into the future, the intersection of P1∩P2∩P3 may then be accessed to determine what additional data chunks may be identified by the predicted data sets therewith.

If, at decision block 430, the threshold size has been met, then the method 400 proceeds to block 434, where the storage controller 108 (e.g., via the array tuner 212) stops generating load commands and therefore the storage system 102 stops loading predicted data sets into the cache 116.

The method 400 may repeat, in whole or part, at some point during each epoch (e.g., at the start of new epochs).

As a result of implementing the above-described approach, a storage system 102 may improve cache hit rates significantly with lookaheads many minutes into the future, i.e. 30 minutes, such as where the target storage tier is a predictive solid state drive (SSD) cache, all while keeping overhead low. This may improve application performance, and hence storage system performance, by improving cache hits and reducing wasted data movement.

In some embodiments, the computing system is programmable and is programmed to execute processes including the processes of methods 600 and/or 700 discussed herein. Accordingly, it is understood that any operation of the computing system according to the aspects of the present disclosure may be implemented by the computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include for example non-volatile memory including magnetic storage, solid-state storage, optical storage, cache memory, and Random Access Memory (RAM).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A method of long-term data caching, comprising:
  comparing, by a storage server, a predicted first data set from a working set predicted to be accessed in a first future time epoch after a current time epoch, to a predicted second data set from the working set pre- dicted to be accessed in a second future time epoch after the first future time epoch;

identifying, by the storage server in response to the comparing, an intersection between logical block address (LBA) ranges in the predicted first data set and the predicted second data set as an overlap subset of data;

caching, by the storage server in response to the identifying, the overlap subset of data from storage devices corresponding to the LBA ranges in a data cache prior to caching additional data from predicted data sets; and caching, after the caching the overlap subset of data and in response to a size of predicted data occupying the data cache remaining below a threshold size, a second overlap subset of data in the data cache, the second overlap subset of data comprising an intersection of LBA ranges in the predicted second data set and a predicted third data set.

2. The method of claim 1, wherein the predicted first data set comprises a first intersection between a first plurality of predicted data sets and a second plurality of predicted data sets and the predicted second data set comprises a second intersection between the second plurality of predicted data sets and a third plurality of predicted data sets.

3. The method of claim 1, further comprising:
caching, by the storage server after caching the overlap subset of data, the predicted first data set in the data cache.

4. The method of claim 1, further comprising:
stopping, by the storage server in response to a null determined from an intersection between LBA ranges of two data sets from the working set, the identifying at the null determination.

5. The method of claim 1, further comprising:
caching, after the caching the overlap subset of data, data sets starting with the predicted first data set, until a threshold size of the data cache is met.

6. The method of claim 1, wherein each future time epoch comprises a plurality of minutes up to one hour.

7. A non-transitory machine readable medium having stored thereon instructions for performing a method comprising machine executable code which when executed by at least one machine, causes the machine to:
compare a plurality of predicted data sets comprising logical block address (LBA) ranges from a working set predicted to be accessed in a corresponding plurality of future time epochs after a current time epoch, the plurality of predicted data sets comprising a first predicted data set, a second predicted data set, and a third predicted data set;
determine a first overlap subset of data from an intersection between the LBA ranges of the first predicted data set and the second predicted data set and a second overlap subset of data from an intersection between the LBA ranges of the second predicted data set and the third predicted data set;
determine a third overlap subset of data from an intersection between the first overlap subset of data and the second overlap subset of data;
cache the third overlap subset of data from a storage device corresponding to the LBA ranges in a data cache prior to caching the first and second overlap subsets of data; and
cache the first overlap subset of data in the data cache after caching the third overlap subset of data in response to a size of predicted data occupying the data cache remaining less than a threshold size.

8. The non-transitory machine readable medium of claim 7, further comprising machine executable code that causes the machine to:
cache the first predicted data set in the data cache in response to a size of predicted data occupying the data cache including the first, second, and third overlap subsets of data remaining less than the threshold size.

9. The non-transitory machine readable medium of claim 7, further comprising machine executable code that causes the machine to:
cache the first overlap subset of data prior to the second overlap subset of data in the data cache in response to a size of predicted data occupying the data cache including the third overlap subset of data remaining less than the threshold size.

10. The non-transitory machine readable medium of claim 7, wherein if a null is determined from an intersection between LBA ranges of two predicted data sets from the working set, the machine stops determining at that null determination.

11. The non-transitory machine readable medium of claim 7, wherein each future time epoch comprises a plurality of minutes up to one hour.

12. The non-transitory machine readable medium of claim 7, wherein each future time epoch comprises a plurality of hours down to one hour.

13. The non-transitory machine readable medium of claim 7, further comprising machine executable code that causes the machine to:
repeat the comparing, determining, and caching at a start of each new time epoch.

14. A computing device comprising:
a memory containing machine readable medium comprising machine executable code having stored thereon instructions for performing a method of long-term data caching;
a processor coupled to the memory, the processor configured to execute the machine executable code to cause the processor to:
compare a plurality of predicted data sets comprising logical block address (LBA) ranges from a working set predicted to be accessed in a corresponding plurality of future time epochs, the plurality of predicted data sets comprising first, second, and third predicted data sets;
determine a first overlap subset of data from an intersection between the LBA ranges of the first predicted data set and the second predicted data set and a second overlap subset of data from an intersection between the LBA ranges of the second predicted data set and the third predicted data set;
determine a third overlap subset of data from an intersection between the first overlap subset of data and the second overlap subset of data;
cache the third overlap subset of data from a storage device corresponding to the LBA ranges in a data cache prior to caching the first and second overlap subsets of data; and
cache the first overlap subset of data in the data cache after caching the third overlap subset of data in response to a size of predicted data occupying the data cache remaining less than a threshold size.

15. The computing device of claim 14, the machine executable code further causing the processor to:
cache the first predicted data set prior to caching the second predicted data set in response to a size of predicted data occupying the data cache including the first, second, and third overlap subsets of data remaining less than the threshold size.

16. The computing device of claim 14, the machine executable code further causing the processor to:
cache the first overlap subset of data prior to the second overlap subset of data in response to a size of predicted data occupying the data cache including the third overlap subset of data remaining less than the threshold size.

17. The computing device of claim 14, wherein the computing device comprises the storage device and the data cache.

18. The computing device of claim 14, wherein the computing device comprises a server separate from the storage device and the data cache.

19. The computing device of claim 14, wherein each future time epoch comprises a plurality of minutes up to one hour.

* * * * *